US012771107B1

(12) United States Patent
Jolly

(10) Patent No.: US 12,771,107 B1
(45) Date of Patent: Oct. 20, 2026

(54) SOLID ARTICULATING COVER WITH SIDE SHIELDS FOR ELECTRICAL OUTLET BOX

(71) Applicant: ABB SCHWEIZ AG, Baden (CH)

(72) Inventor: Kevin Jolly, Cordova, TN (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 19/235,396

(22) Filed: Jun. 11, 2025

(51) Int. Cl.
*H02G 3/08* (2006.01)
*H02G 3/16* (2006.01)

(52) U.S. Cl.
CPC ............... *H02G 3/16* (2013.01); *H02G 3/081* (2013.01)

(58) Field of Classification Search
CPC ................................ H02G 3/16; H02G 3/081
USPC .................................................. 220/3.5, 3.2
See application file for complete search history.

(56) References Cited

U.S. PATENT DOCUMENTS 4,609,119 A * 9/1986 Richter, Sr. ............ H02B 1/048 220/3.6
6,769,562 B2 * 8/2004 Schroeder .............. H02G 3/123 220/477
7,677,512 B1 * 3/2010 Ford ...................... H02G 3/126 248/200.1
2008/0053698 A1 * 3/2008 Purves ................ H01R 13/502 174/59
2009/0205864 A1 * 8/2009 McCarthy .............. H02G 3/081 174/481
2016/0359305 A1 * 12/2016 Hemingway ........ H05K 5/0221
2019/0036316 A1 * 1/2019 Van Baelen ......... G02B 6/4444
2025/0063678 A1 * 2/2025 Kiyota ................... H02G 3/081
2025/0070539 A1 * 2/2025 Wang ..................... H02G 3/081

* cited by examiner

*Primary Examiner* — Jacob K Ackun
(74) *Attorney, Agent, or Firm* — Greenberg Traurig, LLP

(57) ABSTRACT

An outdoor electrical outlet assembly can include a cover assembly configured to be installed over a surface of the housing of the outlet assembly. The cover assembly can include a cover that can rotate from a closed configuration to an open configuration. When the cover is in the open configuration, a portion of the cover can be disposed in an opening of a wall, which can prevent breakage of the cover. Cover assemblies according to some embodiments of the present disclosure can include side shields, channels, and protrusions, among other elements to improve the functionality of the outdoor electrical outlet assemblies.

20 Claims, 15 Drawing Sheets

SOLID ARTICULATING COVER WITH SIDE SHIELDS FOR ELECTRICAL OUTLET BOX

FIELD

This disclosure relates generally to cover assemblies. More particularly, this disclosure relates to cover assemblies configured to cover electrical devices such as, but not limited to, electrical outlet assemblies.

BACKGROUND

Outlet box covers can be used to cover an electrical outlet and may be required to comply with industry requirements. Outlet box covers can protrude and be broken, leaving the outlet box uncovered. Such uncovered outlet boxes can be exposed to the elements (e.g., rain).

SUMMARY

In some embodiments, an assembly includes a housing configured to be installed in an opening of a wall. In some embodiments, the housing includes a first side, a second side, and a third side. In some embodiments, the first side is open. In some embodiments, the second side extends from an outer perimeter of the first side towards the third side. In some embodiments, the third side is opposite the first side. In some embodiments, the second side is orthogonal to the first side. In some embodiments, a cover assembly is movably coupled to the housing. In some embodiments, the cover assembly includes a cover that has a closed configuration and an open configuration. In some embodiments, the cover is configured to transition from the closed configuration to the open configuration by rotating the cover from a position covering the first side of the housing to a position where a gap is disposed between the cover and a bottom of the first side of the housing. In some embodiments, the cover includes a first side panel extending from a first edge of the outer perimeter of the cover, and a second side panel extending from a second edge of the outer perimeter of the cover. In some embodiments, when the cover is in the closed configuration, an outer surface of the cover is flush with an outer surface of the wall. In some embodiments, when the cover is in the open configuration, at least one of the first side panel or the second side panel at least partially extends into the opening of the wall.

In some embodiments, an inner face of the first side panel extends orthogonally from an inner face of the cover. In some embodiments, an inner face of the second side panel extends orthogonally from the inner face of the cover.

In some embodiments, when the cover is in the closed configuration, the first side panel and the second side panel are configured to be positioned inside the opening of the wall.

In some embodiments, when the cover is in the closed configuration, the cover covers the first side of the housing.

In some embodiments, when the cover is in the closed configuration, the cover seals at least part of the first side of the housing.

In some embodiments, the cover includes an opening at a bottom edge of the cover and, when the cover is in the closed configuration, the opening at the bottom edge of the cover is configured to allow an electrical cord to enter the housing.

In some embodiments, the cover assembly further includes a mount coupled to a top of the cover.

In some embodiments, the mount is configured to enable the rotation of the cover from the closed configuration to the open configuration.

In some embodiments, an outer edge of the first side panel and an outer edge of the second side panel are curved.

In some embodiments, an assembly includes a housing configured to be installed in an opening of a wall. In some embodiments, the housing includes a first side, a second side, and a third side. In some embodiments, the first side is open. In some embodiments, the second side extends from an outer perimeter of the first side towards the third side. In some embodiments, the third side is opposite the first side. In some embodiments, the second side is orthogonal to the first side. In some embodiments, the assembly includes a cover assembly that is movably coupled to the housing. In some embodiments, the cover assembly includes a cover that has a closed configuration and an open configuration. In some embodiments, the cover is configured to transition from the closed configuration to the open configuration by rotating the cover from a position covering the first side of the housing to a position where a gap is disposed between the cover and a bottom of the first side of the housing. In some embodiments, the cover includes a first side panel extending from a first edge of the outer perimeter of the cover, and a second side panel extending from a second edge of the outer perimeter of the cover. In some embodiments, an outer edge of the first side panel and an outer edge of the second side panel are curved. In some embodiments, the cover assembly includes a frame that surrounds the outer perimeter of the housing. In some embodiments, a channel can be formed between the frame and the housing. In some embodiments, the channel is configured to receive the side first side panel and the second side panel. In some embodiments, when the cover is in the closed configuration, an outer surface of the cover is flush with an outer surface of the wall.

In some embodiments, the first edge of the outer perimeter of the cover and the second edge of the outer perimeter of the cover are parallel.

In some embodiments, a first channel is formed in the first side panel and a second channel is formed in the second side panel.

In some embodiments, a first cavity is formed between a fourth side of the housing and a first side of the frame, and a second cavity is formed between a fifth side of the housing and a second side of the frame.

In some embodiments, the first cavity is configured to receive the first side panel, and the second cavity is configured to receive the second side panel.

In some embodiments, when the cover is in the open configuration, a weight of the cover is configured to apply a force to push the cover into a closed configuration.

In some embodiments, when the cover is in the closed configuration, the frame, the cover, and the wall are flush.

In some embodiments, when the cover is in the open configuration, at least one of the first side panel or the second side panel at least partially extend into the opening of the wall.

In some embodiments, when the cover is in the open configuration, the first side panel and the second side panel are disposed completely outside the opening of the wall.

In some embodiments, a cover assembly is configured to be coupled to a housing. In some embodiments, the cover assembly includes a frame defining an outer perimeter of the cover assembly. In some embodiments, a cover can be rotatably connected to the frame. In some embodiments, the cover has a closed configuration and an open configuration.

In some embodiments, when the cover is in the closed configuration, the cover is flush with an outer surface of the frame. In some embodiments, the cover is configured to rotate from the closed configuration to the open configuration. In some embodiments, the cover includes a first side panel extending from a first edge of the outer perimeter of the cover, and a second side panel extending from a second edge of the outer perimeter of the cover. In some embodiments, when the cover is in the closed configuration, the first side panel and the second side panel are configured to extend past the frame. In some embodiments, when the cover is in the open configuration, a portion of at least one of the first side panel and the second side panel are configured to at least partially extend through the frame. In some embodiments, the cover assembly includes a mount. In some embodiments, the mount is coupled to a top of the cover. In some embodiments, the mount is configured to enable the rotation of the cover from the closed configuration to the open configuration.

In some embodiments, the frame is configured to be secured to a housing such that the cover closes the housing in the closed configuration.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Outlet box covers can be used to cover an electrical outlet and may be required to comply with industry requirements. Outlet box covers can protrude and be broken, leaving the outlet box uncovered. Such uncovered outlet boxes can be exposed to the elements (e.g., rain).

In some situations, covers can be used for outdoor electrical outlet boxes. In some embodiments, the covers can protrude outside of a wall in either the open or closed configurations. Covers that protrude beyond the surface of the wall can create hazards and can cause the covers to be susceptible to inadvertent breaking. In some cases, a person or animal can hit the cover, causing the cover assembly to break and causing an injury. Electrical outlets without covers can be susceptible to further breakage and pose hazards to the surroundings by being exposed to water and other contaminants.

Embodiments of this disclosure are directed to covers and outdoor plug assemblies configured to be used with powered equipment (e.g., electrical outlets). In some embodiments, the electrical outlet assemblies can be disposed outside of buildings (e.g., on an exterior wall or the like). The electrical outlet assemblies herein can be designed to be flush or substantially flush with the outside of the building when in a closed configuration and can at least partially extend into a building surface when in the open configuration.

In some embodiments, the cover assemblies can be secured to an electrical outlet assembly. In some embodiments, the cover assemblies can be secured to the electrical outlet assembly during manufacturing. In some embodiments, the cover assemblies can be secured to a junction box that is already installed on a building. That is, in some embodiments, the cover assemblies can be retrofit onto an existing electrical outlet assembly.

Figure 1:
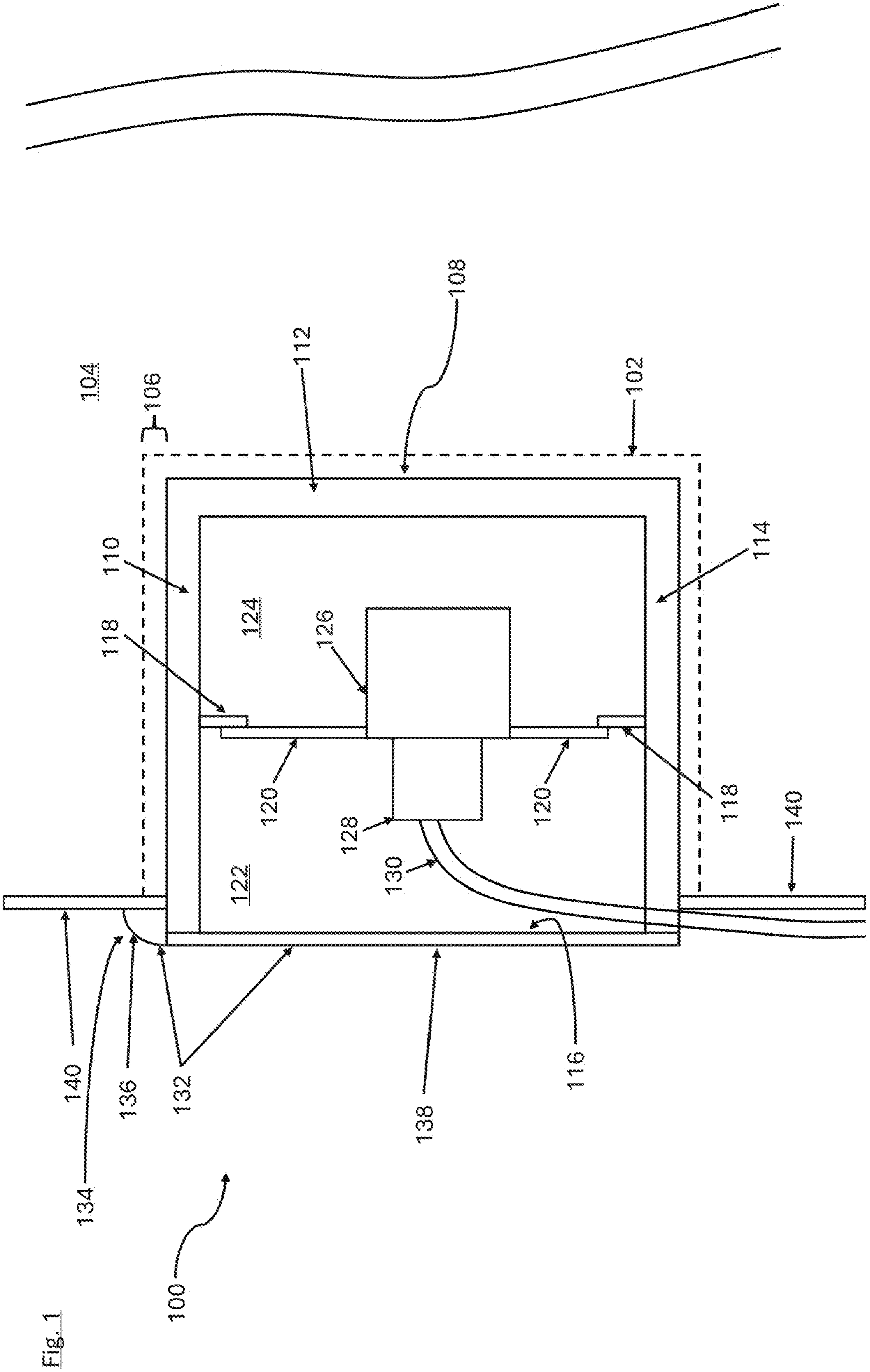
FIG. 1 is a side view of an electrical outlet assembly coupled on an outside of a wall, according to some embodiments.

FIG. 1 is a schematic diagram of an assembly 100, according to some embodiments. In some embodiments, the assembly 100 can be an outdoor plug, housing or junction box, and cover assembly. It is to be appreciated that the use of the assembly is an example for simplicity of this Specification, but that other types of assemblies including an indoor plug assembly are contemplated within the scope of this disclosure. The assembly 100 can be used in locations in which a cover to prevent ingress of contaminants such as, but not limited to, water or the like can be beneficial.

In some embodiments, the assembly 100 is installed in an opening 102 of a wall 104. In some embodiments, a gap 106 can separate an edge of the opening 102 and an outer surface (e.g., one or more sides) of a housing 108. In some embodiments, the housing 108 can be disposed in the opening 102 of the wall 104. In some embodiments, the housing 108 can extend through the entire width of the wall 104.

In some embodiments, the housing 108 includes one or more sides (e.g., side 110, side 112, side 114, side 116). In some embodiments, a side of the housing 108 can be open (e.g., side 116 of the housing 108 can be open). In some embodiments, the open side of the housing 108 can be devoid of material. In some embodiments, the open side of the housing 108 can enable access to the interior of the housing 108.

As illustrated in FIG. 1, the housing 108 can be a rectangular prism containing the one or more sides (e.g., side 110, side 112, side 114, side 116). In some embodiments, the housing 108 can be any suitable shape. In some embodiments, the housing contains a hollow interior portion. In some embodiments, the housing can be a junction box configured to include an electrical outlet and can be referred to as a junction box, a box, or the like. It is to be appreciated that the housing can include a plurality of electrical outlets, and a particular orientation and installation of the electrical outlet is not intended to be limiting and can vary.

In some embodiments, a first side can be orthogonal to a second side (e.g., side 110 can be orthogonal to side 112). In some embodiments, as shown in FIG. 1, a first side can have a sharp angle defining a boundary between the first side and one or more other sides. In some embodiments, the transition from one side to another side (e.g., the transition from side 112 to side 114) can be sloped, curved, angled, tapered, or a combination thereof.

In some embodiments, as shown in FIG. 1, one or more sides of the housing (e.g., side 110 and side 114) can be coupled to one or more tabs 118. In some embodiments, the one or more tabs 118 can be an extension of one or more sides of a housing (e.g., a side of a housing and a tab are a single, non-separable, piece of material). In some embodiments, the one or more tabs 118 can be removably coupled to a support member 120. In some embodiments, the support member 120 can be directly coupled to one or more sides (e.g., side 110 and side 114) of the housing (e.g., without coupling to the one or more tabs 118). In some embodiments, the support member 120 can be removably coupled to another member (e.g., a tab, a side) via a screw, a nail, or other coupling device. In some embodiments, a first space 122 is defined by the volume from the side 116 to the support member 120, and a second space 124 is defined by the volume from the support member 120 to side 112. In some embodiments, the position and the shape of the support member 120 can be changed. In some embodiments, because of changes in the position and shape of the support member 120, the size of the first space 122 and the second space 124 can be varied.

In some embodiments, an electrical outlet 126 can be coupled to the support member 120. In some embodiments, the electrical outlet 126 can accommodate a plug 128 (i.e., a plug 128 can be inserted into the electrical outlet 126). In some embodiments, the plug 128 can be attached to a cord 130. In some embodiments, the plug 128 can be coupled to the electrical outlet 126 to permit electricity to flow through the plug 128 and the cord 130 to provide electricity to a device (e.g., an outdoor light, etc.). In some embodiments, a side of the housing (e.g., side 114) can enable the cord 130 to extend from outside the housing 108 to inside the housing 108.

In some embodiments, a cover assembly 132 can be coupled to the housing 108 in the opening 102. In some embodiments, the cover assembly 132 includes a frame 134. In some embodiments, the frame 134 can include a top portion 136, side portions, bottom portions, or combinations thereof, among other portions (shown and described in additional detail accordance with FIG. 8 below). In some embodiments, the cover assembly 132 can include a cover 138. In some embodiments, the cover 138 can be a door, a lid, or other similar member. In some embodiments, the cover 138 can be moved between an open configuration and a closed configuration. FIG. 1 displays the cover 138 in a closed configuration. In some embodiments, when the cover 138 is in the closed configuration, the cover 138 can be positioned over a side of the housing 108 (e.g., side 116 of the housing 108). In some embodiments, the cover 138 is configured to cover an open side of the housing 108. In some embodiments, the cover 138 can prevent ingress of water or the like to the side 116 of the housing 108 when the cover 138 is in the closed configuration. In some embodiments, when the cover 138 is in the closed configuration, the cover 138, the housing 108 (e.g., side 114), or a combination thereof, can enable the cord 130 to extend from outside the housing 108 to inside the housing 108 (e.g., to extend into first space 122). In some embodiments, when the cover 138 is in the open configuration, the cover 138 can be spaced apart from the open side of the housing 108. As a result, in some embodiments, when the cover 138 is in the open configuration, the interior portion of the housing 108 (e.g., first space 122) can be accessible. For example, in some embodiments, a user can insert plug 128 into electrical outlet 126 disposed within the housing 108 when the cover 138 is in the open configuration. In some embodiments, when the cover 138 is in the open configuration, at least a portion of the cover 138 can be positioned in the gap 106. In some embodiments, an extension of the cover 138 can extend outside of the top of the cover 138, such that the extension is planar, or substantially planar, with side 110 of the housing 108.

In some embodiments, the cover assembly 132, or a portion of the cover assembly 132 (e.g., the cover 138) can be an attachment. For example, in some embodiments, a cover assembly 132, or the portion of a cover assembly 132, can be coupled (e.g., attached) to an already existing housing 108. In some embodiments, a cover assembly 132 can be attached to a housing 108 to replace a different cover assembly. In some embodiments, the cover assembly 132 can be attached to the housing 108 at the time the housing 108 is installed. For example, in some embodiments, the opening 102 can be formed in the wall 104 and the cover assembly 132 can be installed at the same time, or approximately the same time, the housing 108 is installed. In some embodiments, the housing 108 is designed to accommodate the cover assembly 132. In some embodiments, the opening 102 is designed to accommodate the cover assembly 132. In some embodiments, a cover assembly 132 can be coupled to a conventional housing (e.g., a conventional junction box). In some embodiments, a cover assembly 132 is configured to be installed in a conventional opening (e.g., an opening that is used for conventional junction boxes).

As shown in FIG. 1, the outer portion of the cover assembly 132 (e.g., the outside of the cover 138, the top portion 136 of the frame 134) extends beyond an edge 140 of the wall 104, however, it is anticipated that the entire cover assembly 132 can be flush with the edge 140 of the wall 104.

Figure 2:
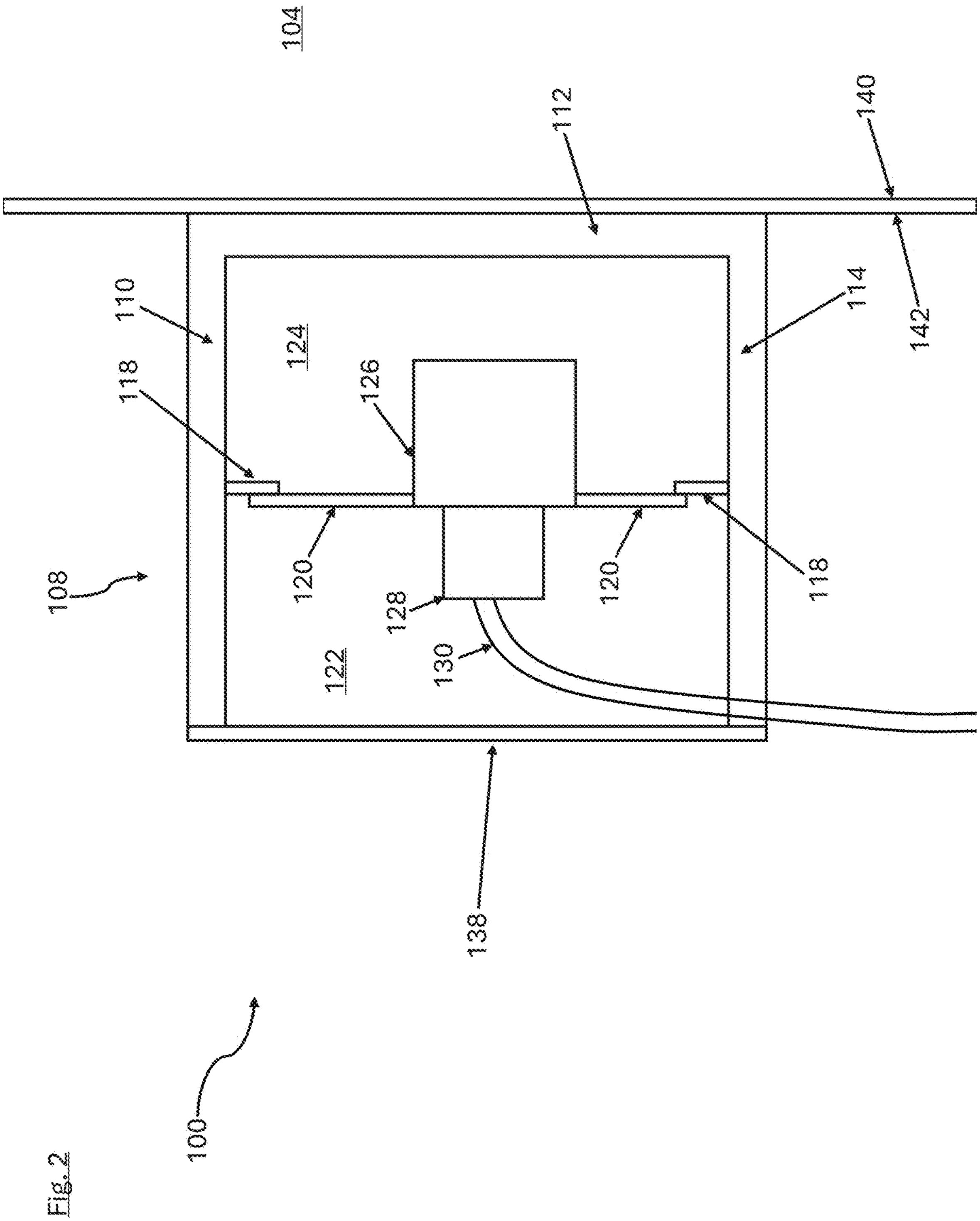
FIG. 2 is a side view of an electrical outlet assembly coupled to an exterior surface, according to some embodiments.

FIG. 2 is a schematic diagram of an assembly 100, according to some embodiments. In some embodiments, as shown in FIG. 2, the housing 108 can be coupled to an exterior surface 142. In some embodiments, the exterior surface 142 can be a wall (e.g., an exterior wall of a house), a post, or other location suitable for coupling to an assembly 100. In some embodiments, the assembly 100 can couple to the exterior surface 142 without being disposed within the exterior surface 142 (e.g., couple to the outside of a wall without being disposed inside a wall). For simplicity of the Specification, features described above in accordance with FIG. 1 that are the same or similar in FIG. 2 have been labeled with like references numbers and will not be described again in additional detail.

Figure 3:
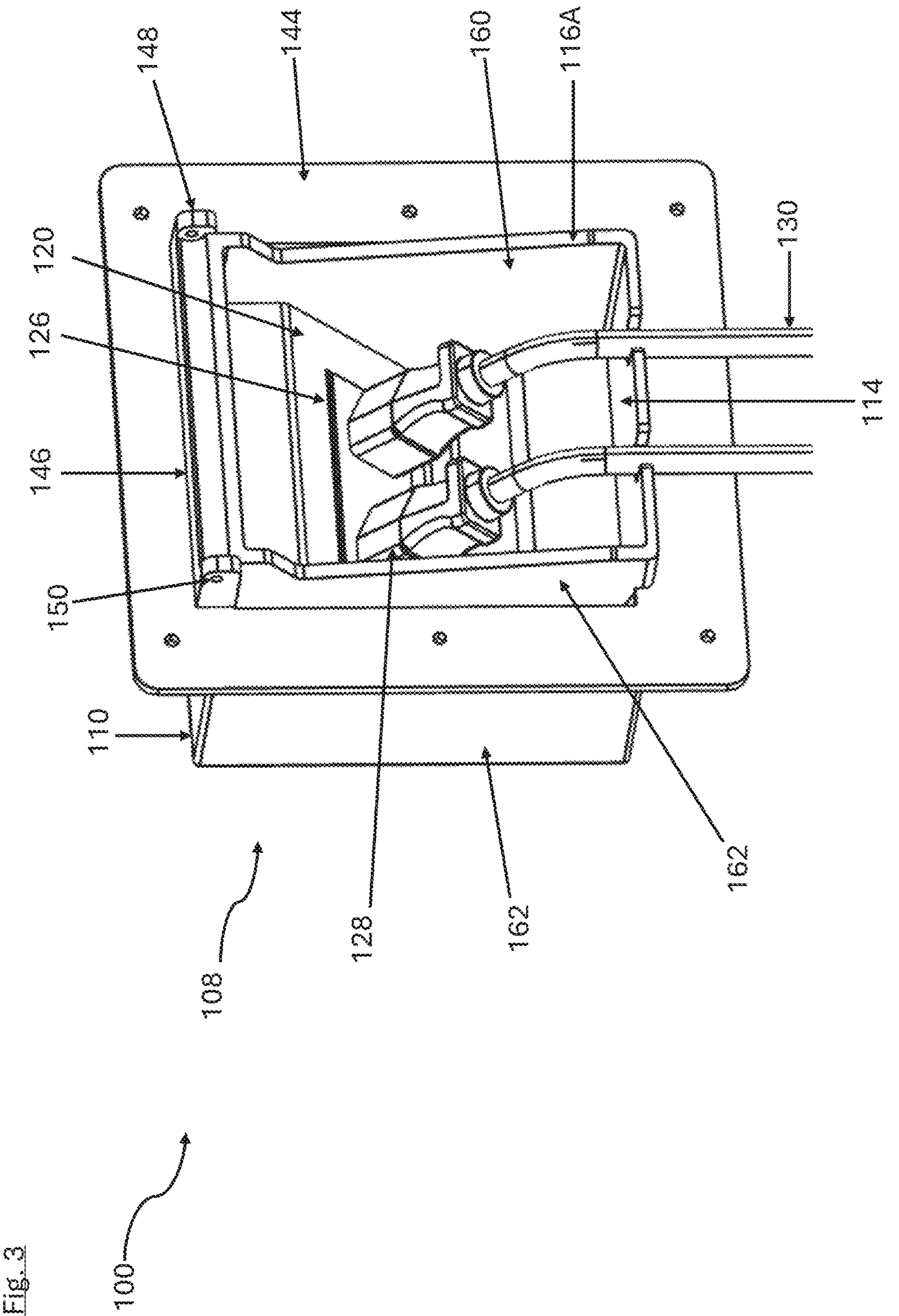
FIG. 3 is a first perspective view of an electrical outlet assembly, according to some embodiments.
Figure 4:
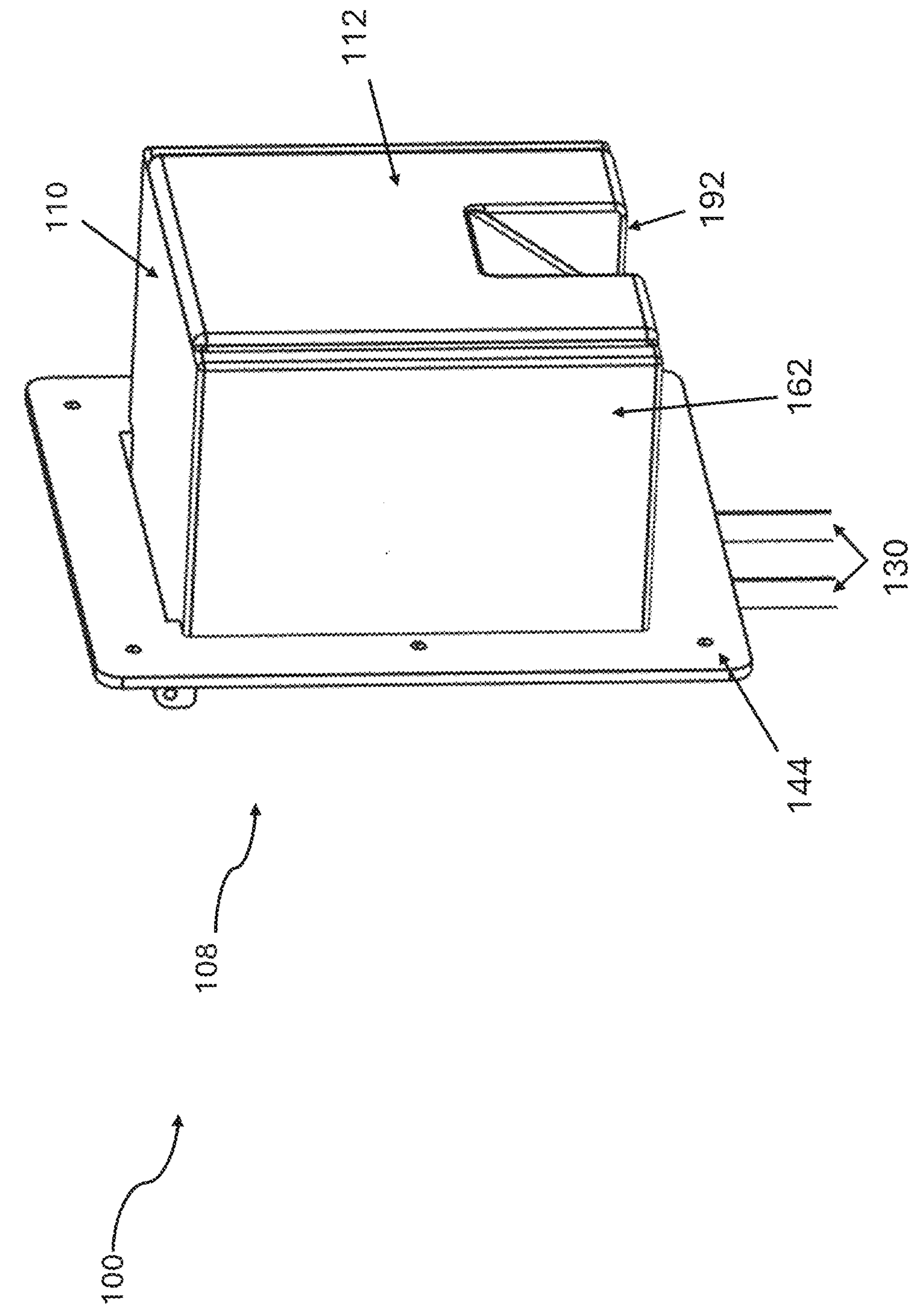
FIG. 4 is a second perspective view of the electrical outlet assembly of FIG. 3, according to some embodiments.

FIG. 3 is a first perspective view of an assembly 100, according to some embodiments. FIG. 4 is a second perspective view of the assembly 100, according to some embodiments. Reference will be made collectively to FIGS. 3 and 4 unless expressly stated otherwise.

The housing 108 can include one or more sides (e.g., side 110, side 112, side 114, side 116, side 160, side 162). As disclosed above, the housing 108 can include an open side (e.g., side 116). In some embodiments, the open side (e.g., side 116) can include an outer perimeter (e.g., outer perimeter 116A) defining the opening of the open side. In some embodiments, a side of the housing 108 (e.g., side 114) can be shaped to enable multiple cords (e.g., cord 130) to enter the housing.

In some embodiments, a cover assembly (e.g., cover assembly 132 of FIG. 1) can include a base 144. In some embodiments, the base 144 can be coupled to the housing 108. In some embodiments, the housing 108 can be secured to a wall (e.g., wall 104 of FIG. 1) or other surface using the base 144. In some embodiments, the base 144 can include a plurality of apertures. In some embodiments, the plurality of apertures can be used to secure the base 144 to another material (e.g., by using one or more fasteners such as, but not limited to, screws, bolts, combinations thereof, or the like). In some embodiments, the base 144 can be coupled to a frame of a cover assembly (e.g., frame 134 of cover assembly 132 of FIG. 1).

In some embodiments, the cover assembly 132 can include a mount (e.g., a cover attachment member 146) including one of more ends (e.g., end 148, end 150). In some embodiments, as shown, for example in FIG. 5, the ends (e.g., end 148, end 150) can be coupled to the housing 108. In some embodiments, the cover attachment member 146 can be formed as part of the housing 108.

As shown in FIG. 4, the housing 108 can include a recess 192. In some embodiments, the recess 192 can enable the assembly 100 to be coupled to another power source (e.g., a general power source). For example, the recess 192 can include an aperture configured to accommodate one or more wires to electrically connect a mains power source with the electrical outlet 126.

Figure 5:
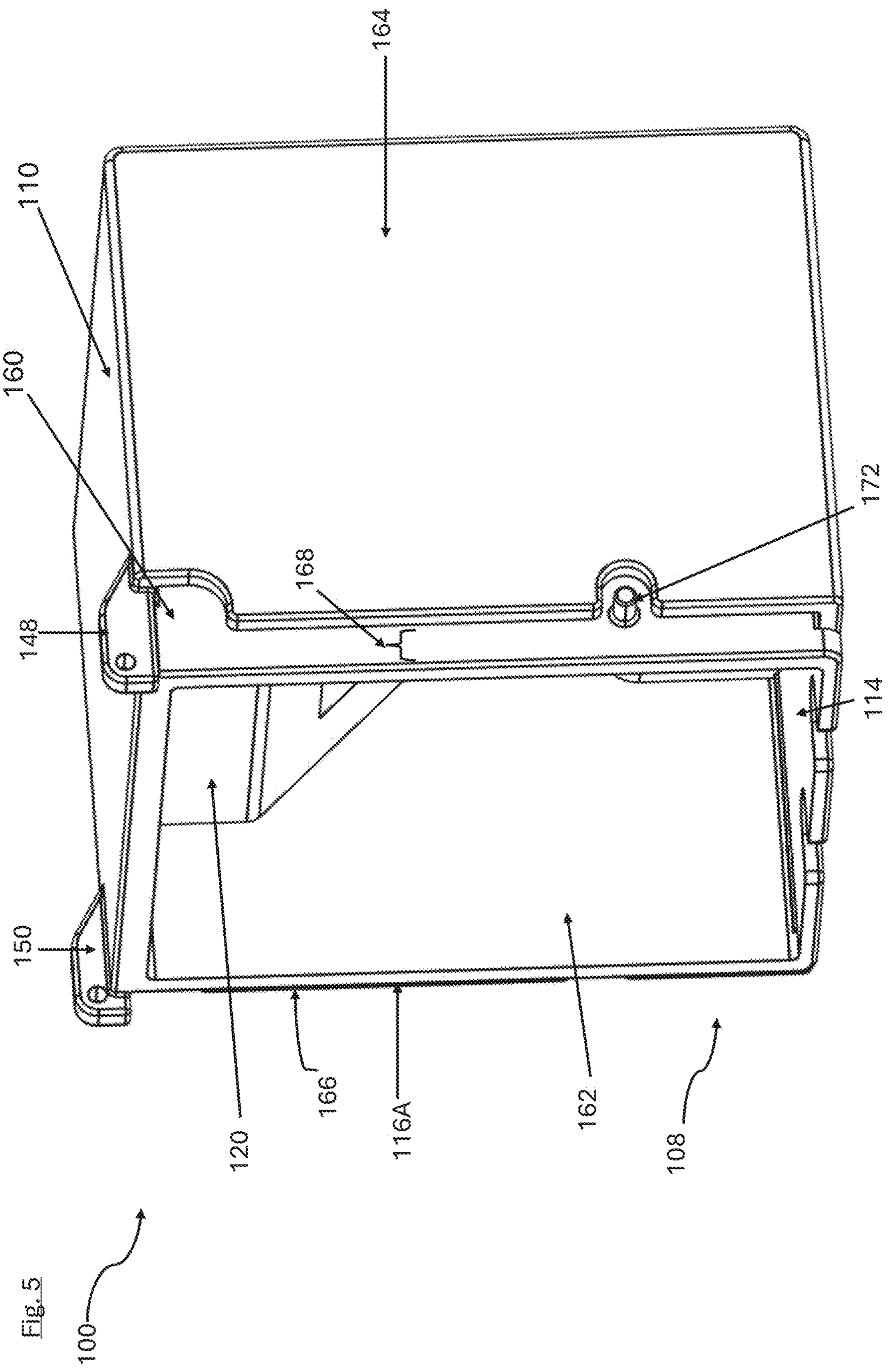
FIG. 5 is a perspective view of an outdoor electrical outlet assembly, including outer walls, according to some embodiments.
Figure 6:
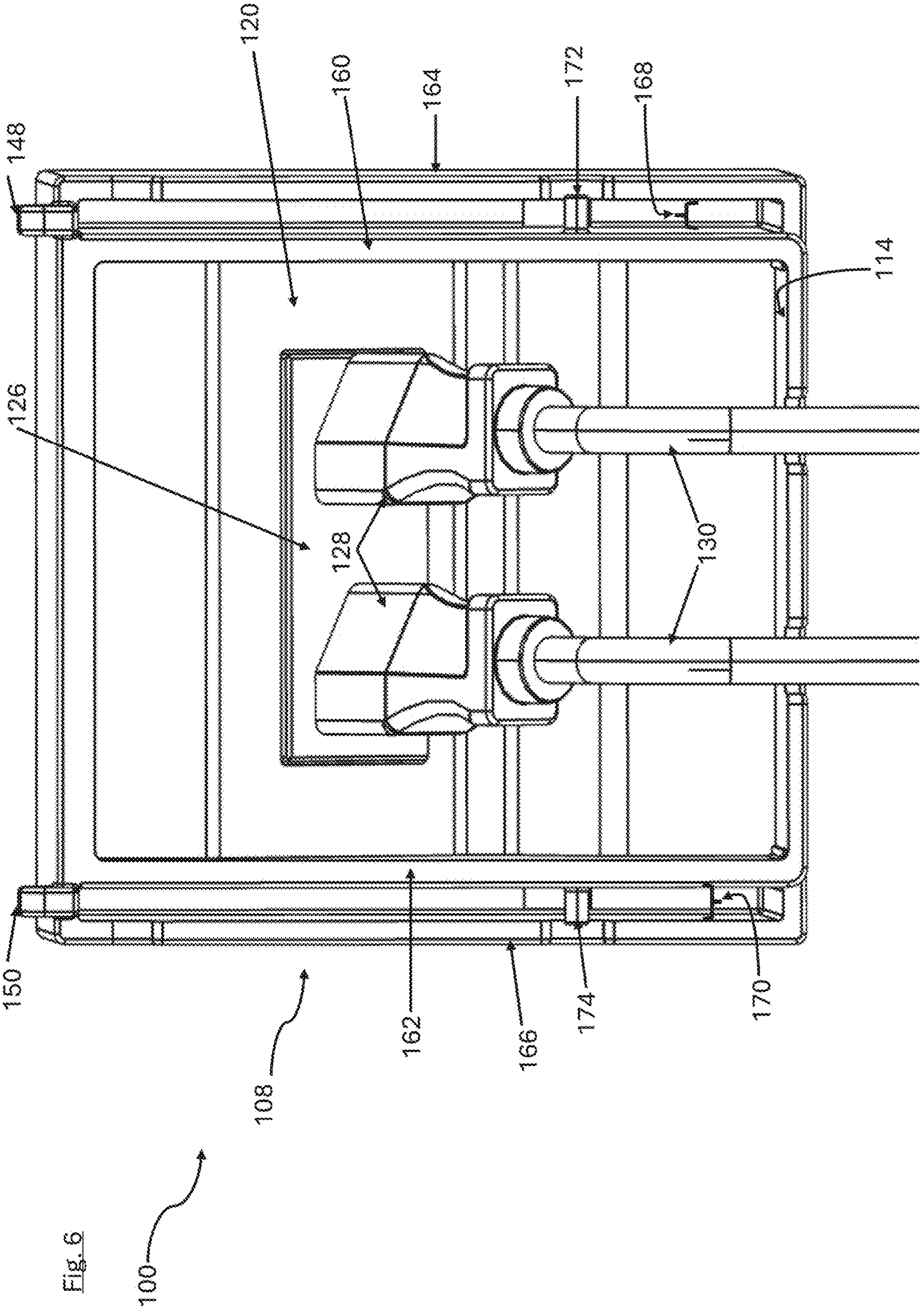
FIG. 6 is a front view of an outdoor electrical outlet assembly, including outer walls, according to some embodiments.

FIG. 5 is a perspective view of an assembly 100, according to some embodiments. FIG. 6 is front view of the assembly 100, according to some embodiments. Reference will be made collectively to FIGS. 5 and 6 unless expressly stated otherwise.

As shown in FIGS. 5 and 6, the housing 108 can include one or more outer walls (e.g., outer wall 164, outer wall 166). In some embodiments, the outer wall can be spaced apart from a side of a housing, creating a cavity between the outer wall and the side of the housing (e.g., outer wall 164 and side 160 can be spaced apart, creating cavity 168, and outer wall 166 and side 162 can be spaced apart, creating cavity 170). In some embodiments, the cavity (e.g., cavity 168, cavity 170) can accept an extension of a cover (e.g., as shown relative to FIG. 15 below).

In some embodiments, an outer wall can be a similar size as a side of a housing. For example, as shown in FIG. 5, outer wall 164 can extend from a position near one edge of a side (e.g., near the edge of side 160 closest to side 116) to the other edge of the side (e.g., the edge of side 160 nearest side 112). In some embodiments, an outer wall can be smaller than a side of the housing 108, which can create a cavity that extends along only a portion of the housing 108.

In some embodiments, an outer wall can be formed onto the housing 108 when the housing is constructed. In some embodiments, one or more outer walls can be attached to an existing housing.

In some embodiments, the housing 108 can include one or more protrusions, protruding out of a side of the housing 108 (e.g., side 160 can include protrusion 172, side 162 can include protrusion 174). In some embodiments, and as described in greater detail below relative to FIG. 8, the protrusions (e.g., protrusion 172, protrusion 174) can restrict the movement of a cover.

In some embodiments, as shown in FIG. 5, an outer wall can be shaped to allow access to the protrusion (e.g., outer wall 164 can be shaped to enable access to protrusion 172).

Figure 7:
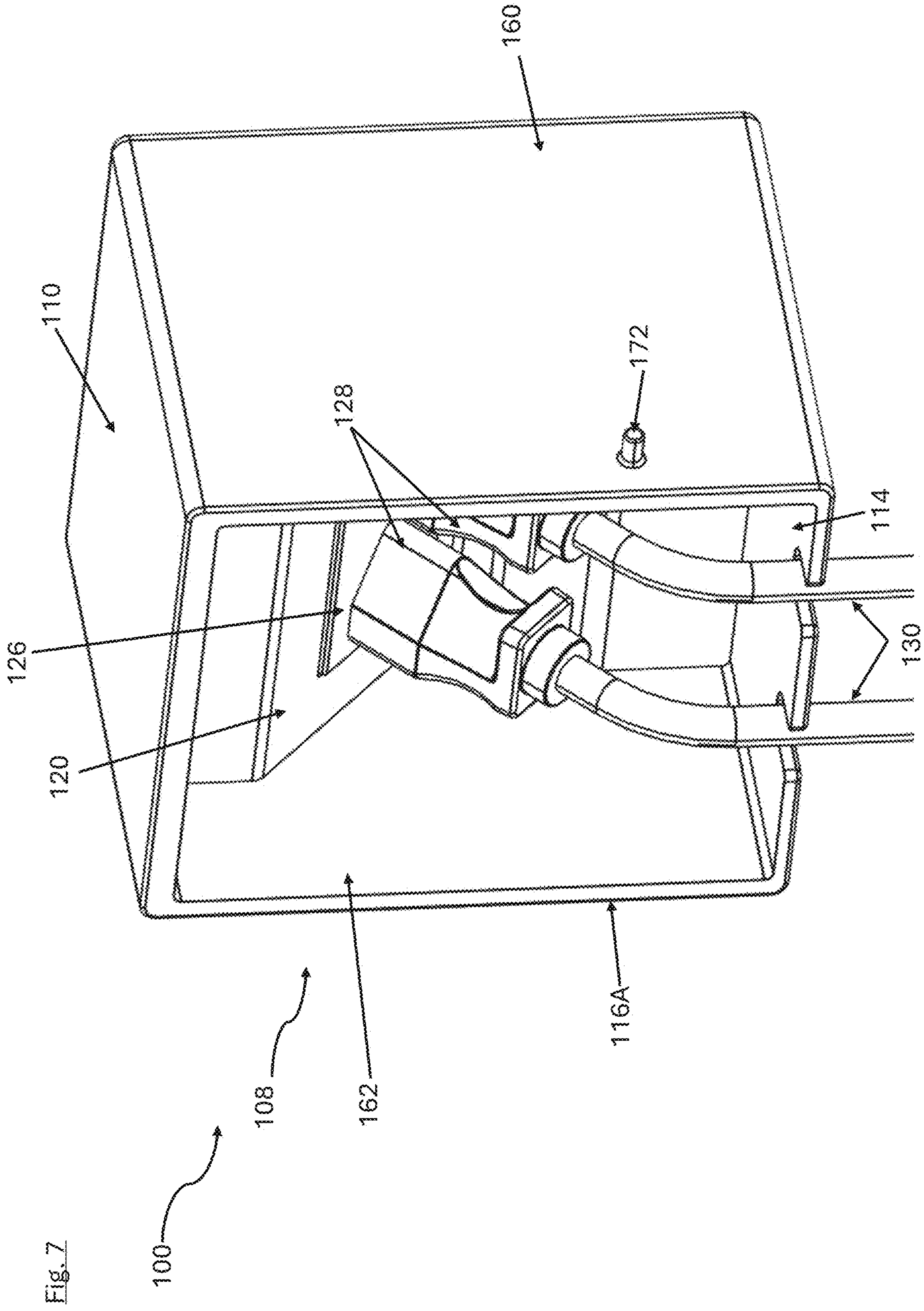
FIG. 7 is a perspective view of an outdoor electrical outlet assembly, according to some embodiments.

FIG. 7 is a perspective view of the housing 108 according to some embodiments. FIG. 7 illustrates the housing 108 without any outer walls attached to the housing 108. In some embodiments, the protrusion 172 can extend from side 160. Similarly, while not shown in FIG. 7, in some embodiments, the protrusion 174 can extend from a similar position from side 162.

Figure 8:
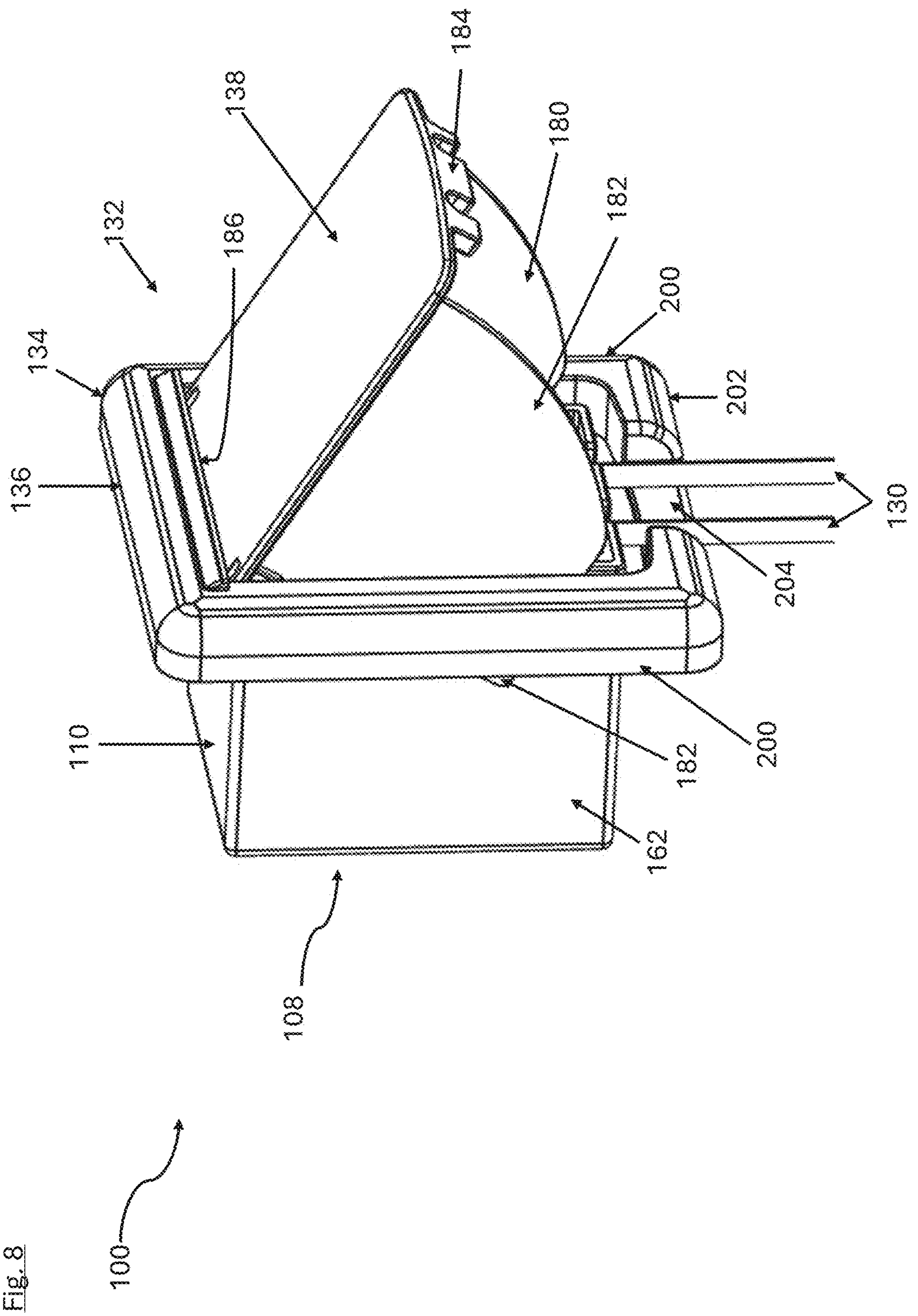
FIG. 8 is a perspective view of an outdoor electrical outlet assembly, including a cover assembly in an open configuration, according to some embodiments.
Figure 9:
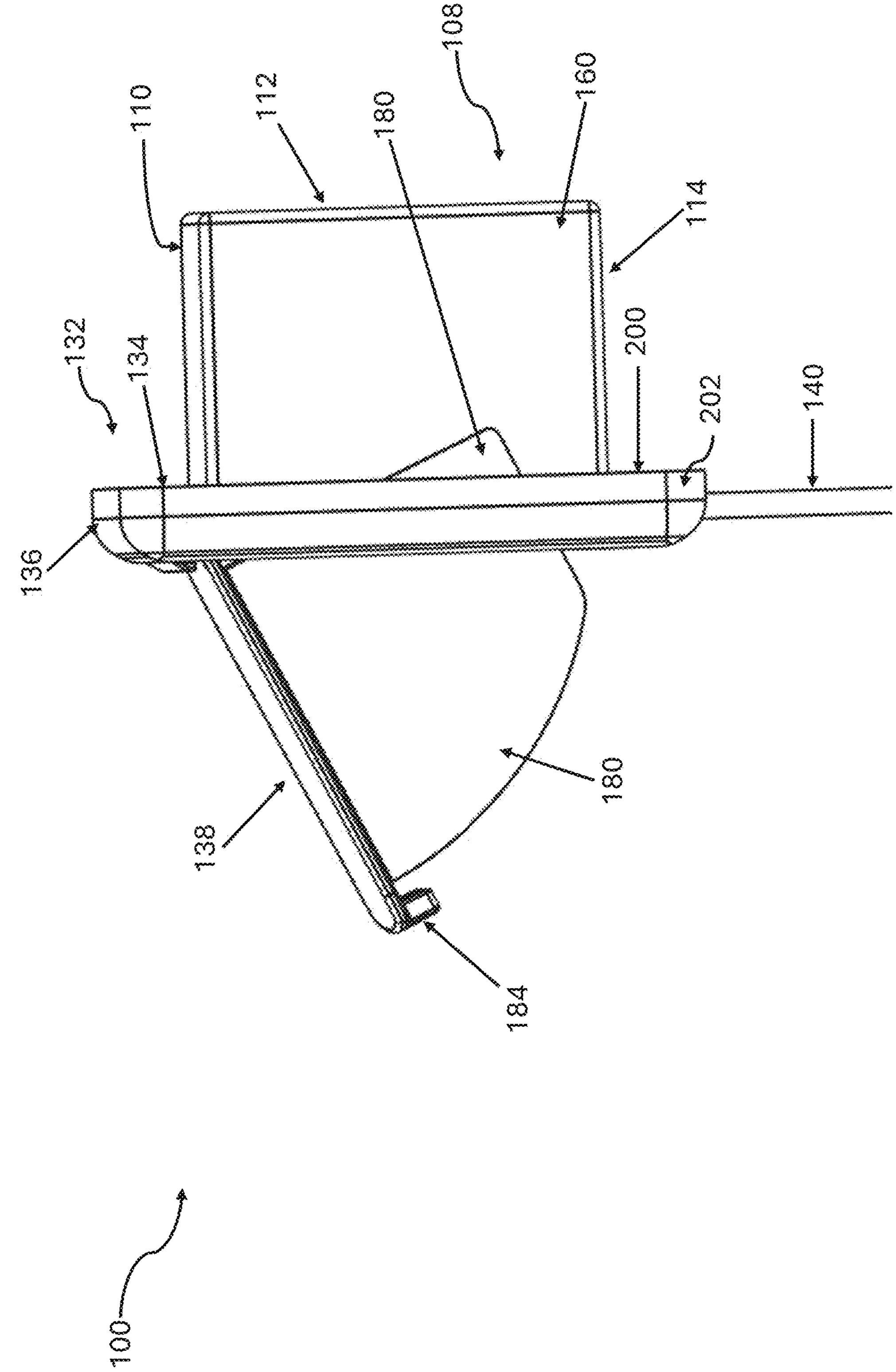
FIG. 9 is a side view of an outdoor electrical outlet assembly, including a cover assembly in an open configuration, according to some embodiments.

FIG. 8 is a perspective view of an assembly 100, according to some embodiments, including the cover 138 in an open configuration. FIG. 9 is a side view of the assembly 100 according to some embodiments, including the cover 138 in the open configuration. Reference will be made collectively to FIGS. 8 and 9 unless expressly stated otherwise.

As shown in FIGS. 8 and 9, the cover assembly 132 can include the cover 138. In some embodiments, the cover 138 can include one or more extensions or side panels (e.g., extension 180, extension 182). In some embodiments, the one or more extensions (e.g., extension 180, extension 182) can extend out of an edge of the cover 138. In some embodiments, the one or more extensions can extend out of the entire length of an edge of a cover. In some embodiments, the one or more extensions can extend out of a portion of an edge of a cover. In some embodiments, the one or more extensions can be orthogonal to the cover. In some embodiments, a first extension 180 can be in a parallel plane to a second extension 182. In some embodiments, an edge of an extension can be curved.

In some embodiments, when the cover is in the open configuration (e.g., as shown in FIGS. 8 and 9), the extensions (e.g., extension 180, extension 182) can prevent ingress to the housing 108 from the sides. In some embodiments, the cover 138 can prevent ingress of contaminants from the side of the housing 108 when the cover 138 is in the open configuration. In some embodiments, when the cover 138 is in the open configuration, a portion of one or more extensions (e.g., extension 180, extension 182) can be positioned outside of the housing 108 (e.g., a portion of extension 180 can be positioned outside of side 160, a portion of extension 182 can be positioned outside of side 162). In some embodiments, when the cover 138 is in the open configuration, the entirety of the one or more extensions can be positioned outside the opening of the wall (e.g., outside of opening 102 of wall 104 of FIG. 1).

In some embodiments, the cover 138 can include a bottom assembly 184. In some embodiments, the bottom assembly can enable one or more cords (e.g., first cord 130, second cord 130) to enter the housing when the cover is in the closed configuration.

In some embodiments, the cover 138 can rotate from an open configuration to a closed configuration about a mount. In some embodiments, a top element 186 of the cover 138 can be coupled to the housing 108. In some embodiments, the top element 186 of the cover 138 can be coupled to a mount (e.g., a cover attachment member 146). In some embodiments, the cover 138 can rotate from a closed configuration to an open configuration about the top element 186 of the cover and/or the cover attachment member 146. In some embodiments, the weight of the cover 138 can force the cover from the open configuration to the closed configuration. For example, in some embodiments, to maintain the cover 138 in the open configuration, a user may need to hold the cover 138 in the open configuration.

In some embodiments, the cover assembly 132 can include a frame 134. In some embodiments, the frame can include a top portion 136, side portions 200 and bottom portion 202. In some embodiments, bottom portion 202 can include a recess 204. In some embodiments, the recess 204 and the bottom assembly 184 can be configured to prevent ingress of contaminants (e.g., water) while enabling one or more cords (e.g., cords 130) to enter the housing 108. In some embodiments, the frame 134 can be coupled to a base (e.g., base 144 of FIG. 3).

Figure 10:
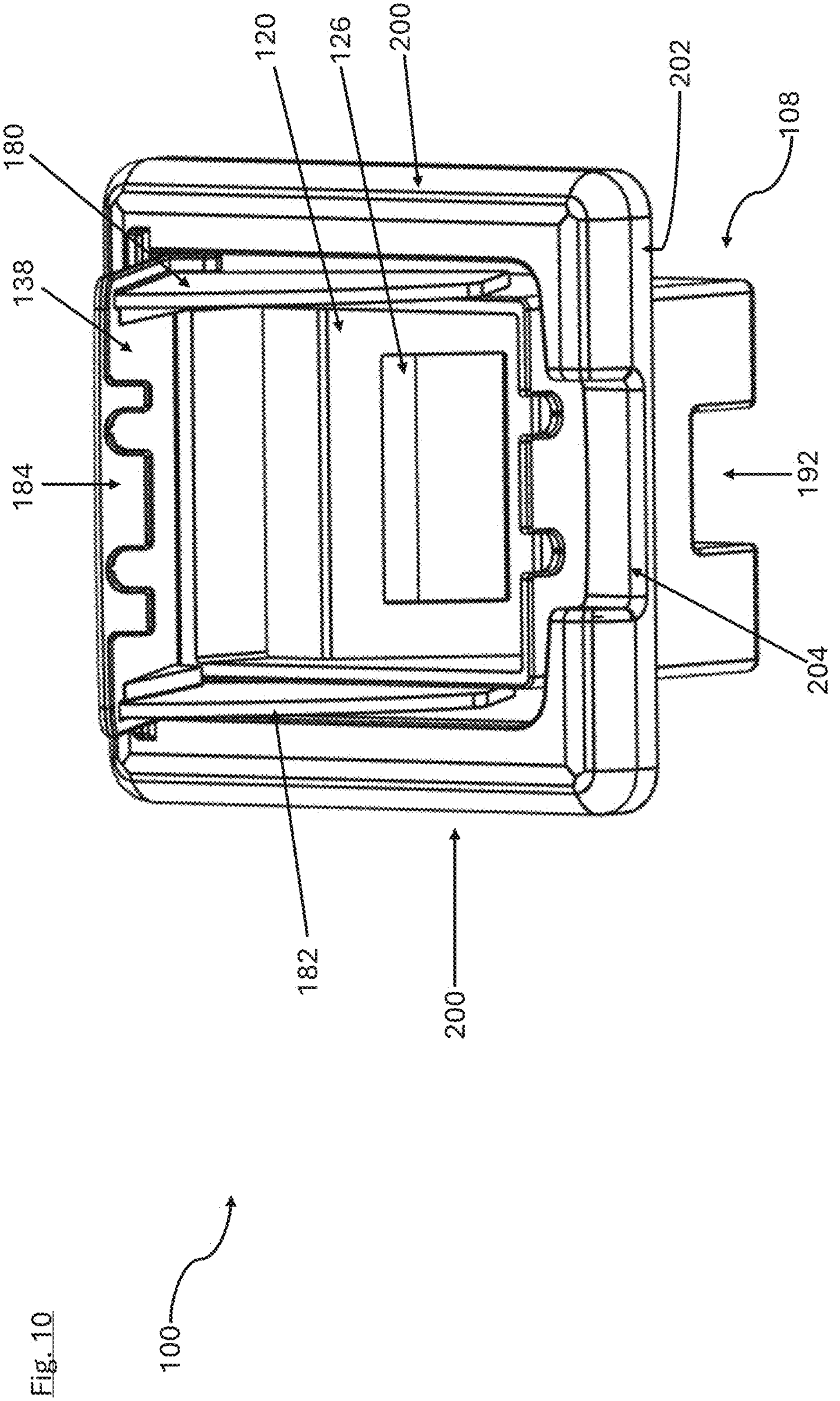
FIG. 10 is a perspective view of an outdoor electrical outlet assembly, including a cover assembly in an open configuration, according to some embodiments.

FIG. 10 is a front perspective view of an assembly 100, according to some embodiments. As shown in FIG. 10, one or more extensions (e.g., extension 180) can be coupled to a cover (e.g., cover 138) inside the outermost edge of the cover 138. In some embodiments, the position of the extensions relative to the outer edge of the cover 138 can permit the extension to pass through the frame (e.g., between side portion 200 and housing 108), as the cover moves from the open configuration to the closed configuration. In some embodiments, the curved edges of the one or more extensions (e.g., extension 180, extension 182) enable smooth rotation of the cover from the closed configuration to the open configuration (e.g., the curved edge can prevent the extensions from contacting the frame 134 or housing 108 while the cover 138 rotates).

Figure 11:
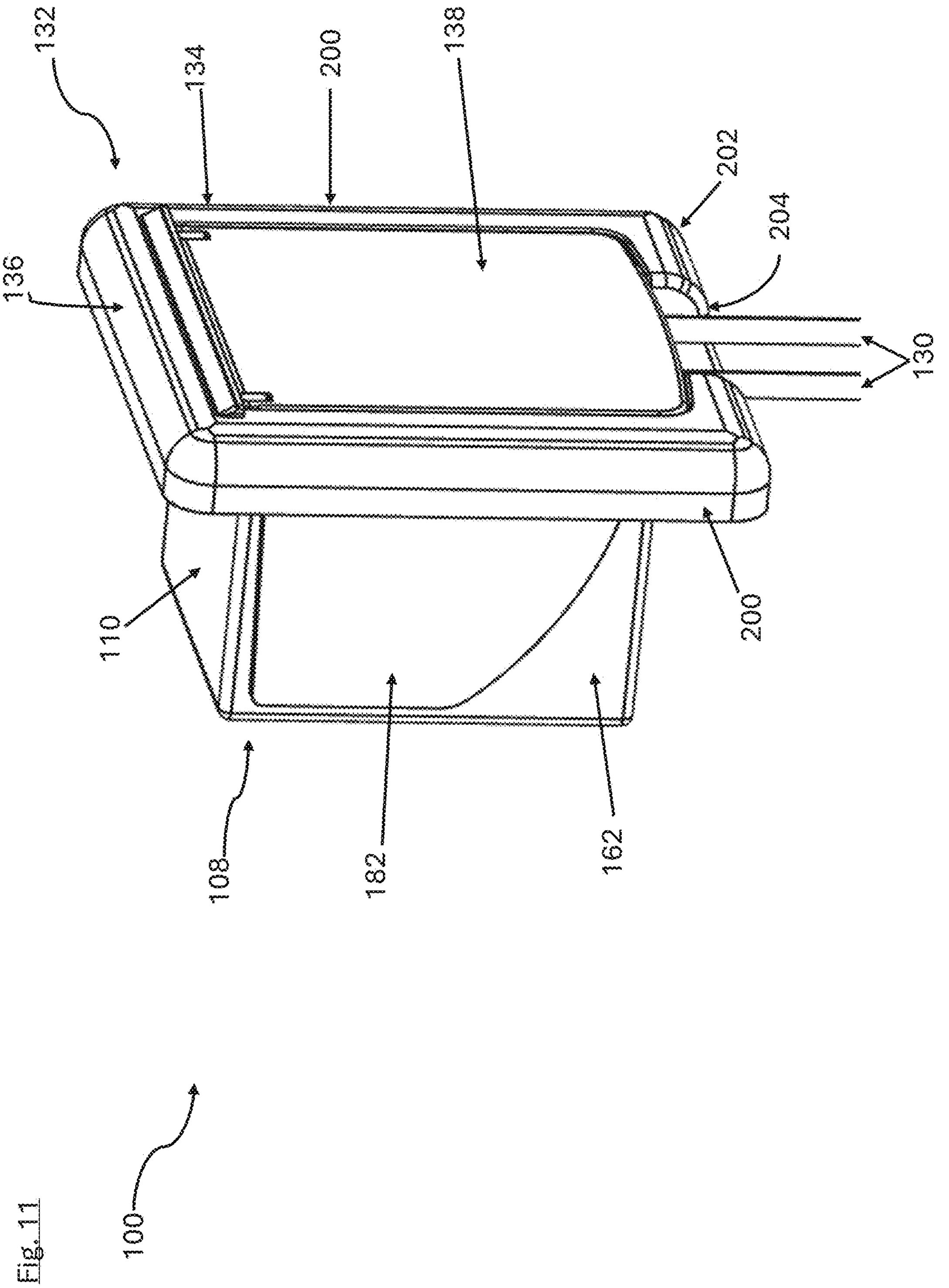
FIG. 11 is a perspective view of an outdoor electrical outlet assembly, including a cover assembly in a closed configuration, according to some embodiments.

FIG. 11 is a perspective view of an assembly 100, according to some embodiments of the present disclosure, with a cover assembly in the closed configuration. As shown in FIG. 11, when the cover 138 is in the closed configuration, one or more extensions (e.g., extension 182) can be positioned adjacent to a side (e.g., side 162) of the housing 108. In some embodiments, when the cover 138 is in the closed configuration, the cover 138 can be flush with the frame 134. In some embodiments, when the cover 138 is in the closed configuration, the cover 138 can seal (e.g., prevent materially from entering) the open side of the housing 108.

Figure 12:
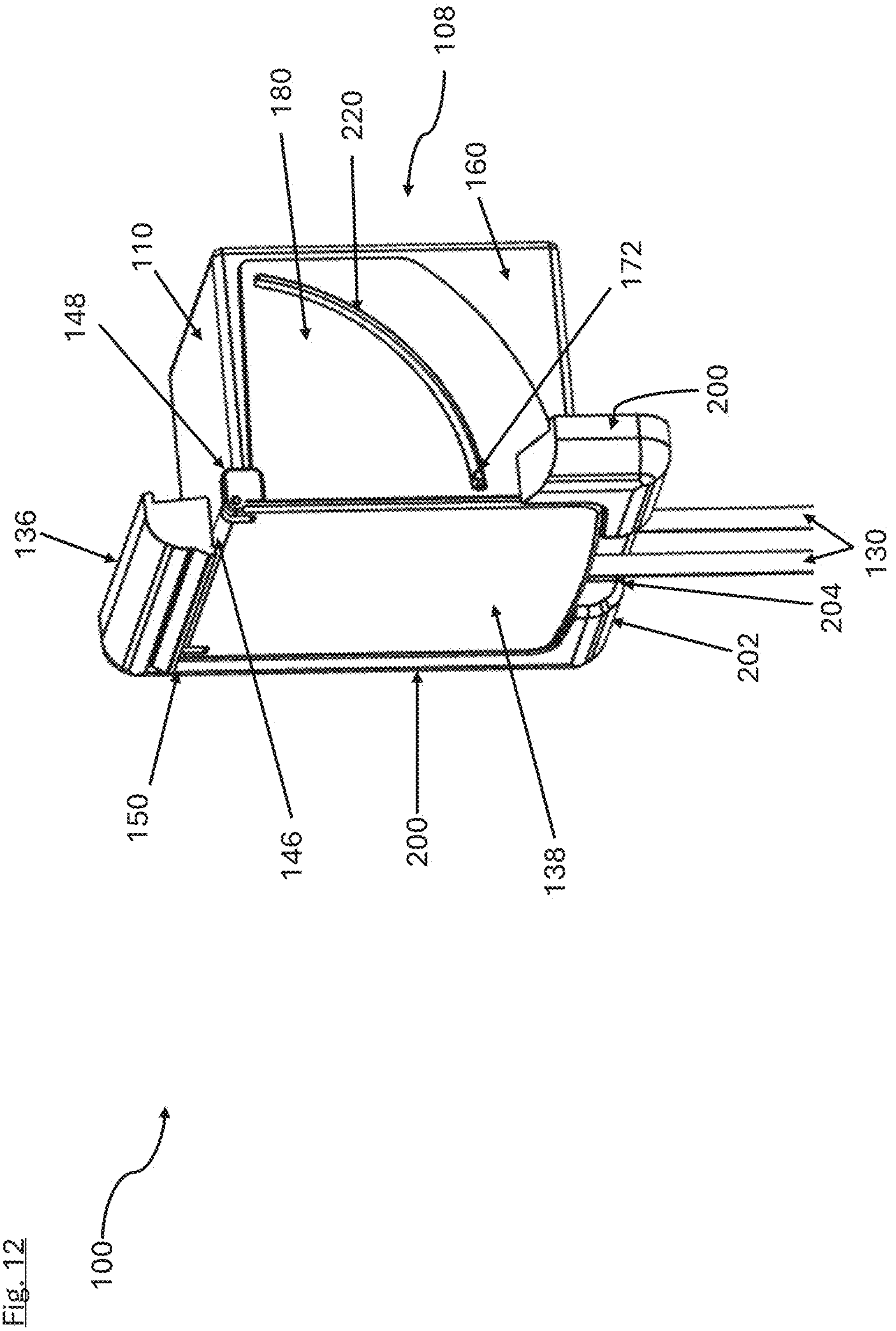
FIG. 12 is a perspective view of an outdoor electrical outlet assembly, including a cover assembly in a closed configuration, according to some embodiments.

FIG. 12 is a perspective view, partially broken away, of an assembly 100 with the cover 138 in the closed configuration, according to some embodiments. In some embodiments, as shown in FIG. 12, an extension (e.g., extension 180) can include a channel 220. In some embodiments, the channel can be devoid of material. In some embodiments, the protrusion 172 of the side 160 of the housing 108 can be positioned inside the channel 220 of the extension (e.g., extension 180). In some embodiments, the protrusion 172 can restrict the movement of the cover 138. For example, the protrusion 172 can be positioned at one end of the channel 220, and the cover 138 can rotate until the protrusion 172 reaches the other end of the channel 220, as can be seen, for example, by comparing the position of the protrusion 172 in channel 220 of FIG. 12 and FIG. 13. Once the protrusion 172 reaches an end of the channel 220, the cover 138 may be prevented from rotating any further, thereby preventing the further opening of the cover 138. In some embodiments, the cover 138 can be made of a material having enough flexibility to be deflected while installing the cover to align the protrusion 172 within the channel 220.

Figure 13:
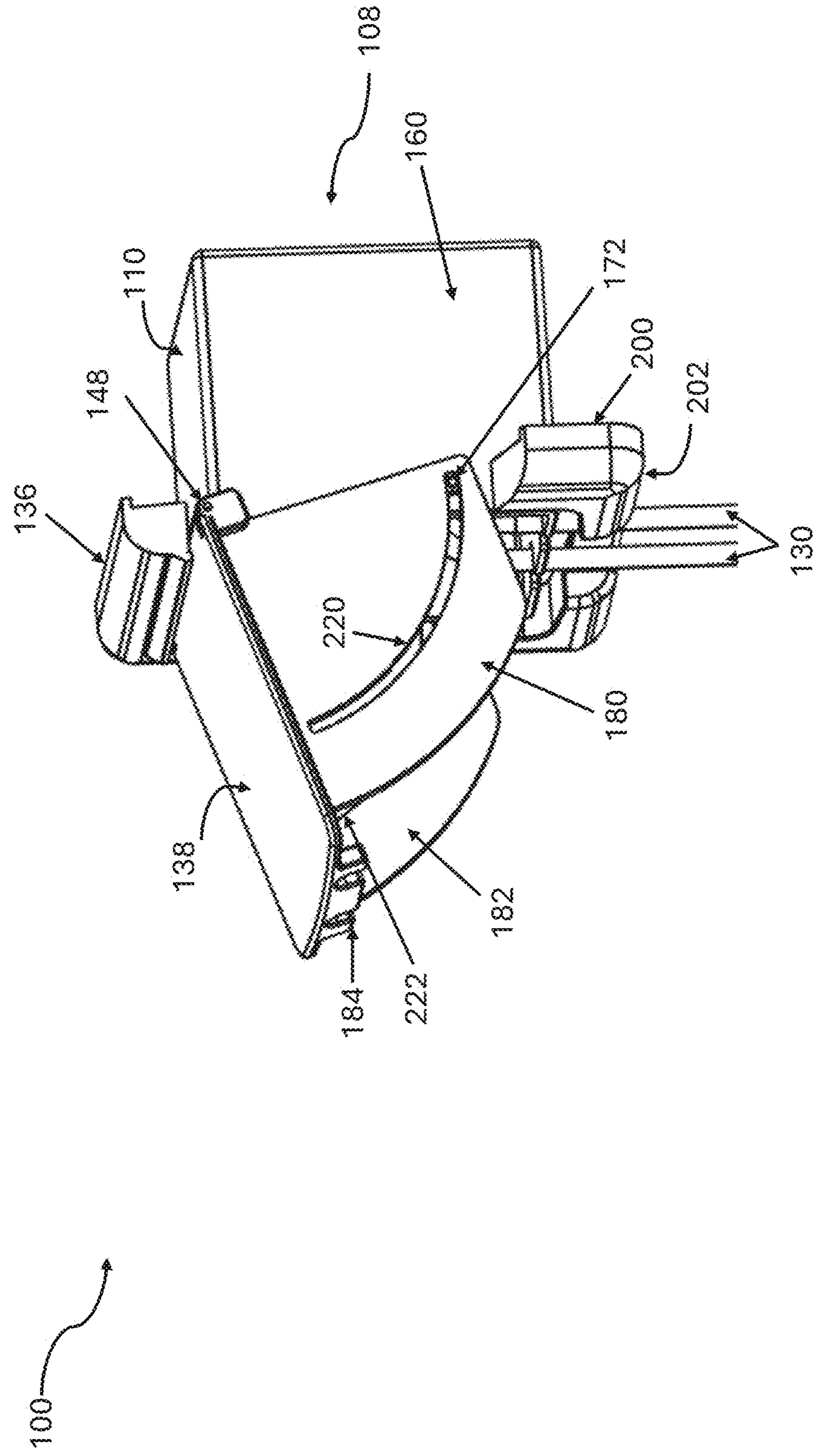
FIG. 13 is a perspective view of an outdoor electrical outlet assembly, including a cover assembly in an open configuration, according to some embodiments.

FIG. 13 is a perspective view, partially broken away, of an assembly 100 with the cover 138 in the open configuration, according to some embodiments. As shown in FIG. 13, two extensions (e.g., extension 180, extension 182) can include channels (e.g., extension 180 can include channel 220 and extension 182 can include channel 222). In some embodiments, both channels can couple to a protrusion and can restrict the movement of the cover 138. In some embodiments, the characteristics of the channel 220 (e.g., the shape, size, length of the channel), can be modified to control the movement of the cover 138. For example, in one embodiment, it may be desirable to limit the rotation of the cover 138 (e.g., because the assembly 100 is in narrow space), and the channel can be shortened to prevent the opening of the cover 138 beyond a desired point.

Figure 14:
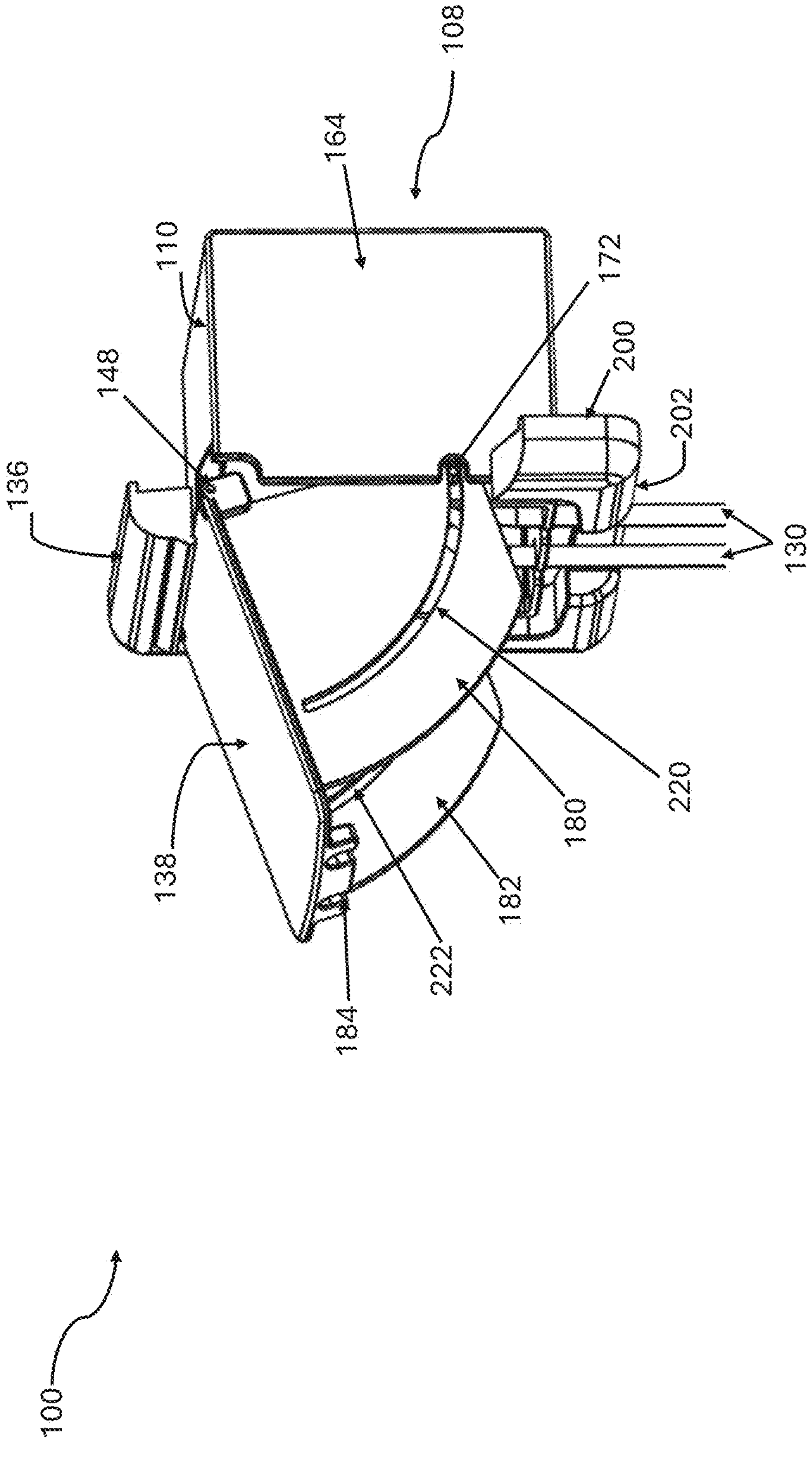
FIG. 14 is a perspective view of an outdoor electrical outlet assembly, including a cover assembly in an open configuration, according to some embodiments.

FIG. 14 shows a perspective view, partially broken away, of an assembly 100 with outer walls coupled to the housing 108 and the cover 138 in the open configuration, according to some embodiments.

As shown in FIG. 14, when the cover 138 is in the open configuration, a portion of the one or more extension(s) (e.g., extension 180, extension 182) can be positioned at least partially inside in the cavities (e.g., cavity 168, cavity 170) between the outer walls (e.g., outer wall 164, outer wall 166), and the sides (e.g., side 160, side 162) of the housing 108. For example, a portion of the extension 180 can be positioned inside the cavity 168 created between side 160 and outer wall 164. Similarly, a portion of the extension 182 can be positioned inside the cavity 170 created between side 162 and outer wall 166.

Figure 15:
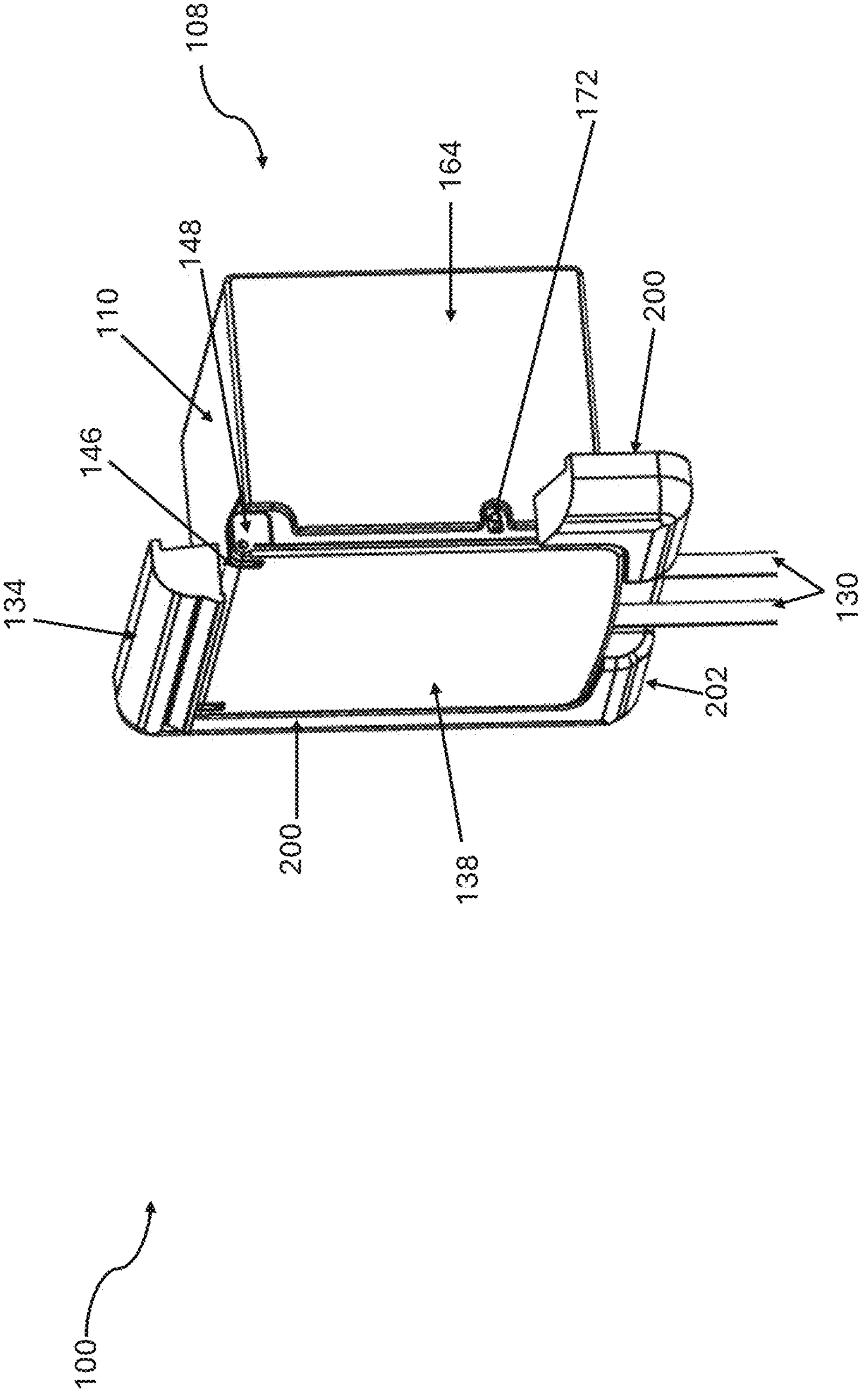
FIG. 15 is a perspective view of an outdoor electrical outlet assembly, including a cover assembly in a closed configuration, according to some embodiments.

FIG. 15 shows a perspective view, partially broken away, of an assembly 100 with outer walls coupled to the housing 108 and the cover 138 in the closed configuration, according to some embodiments. As shown in FIG. 15, when the cover is in the closed configuration, the extension(s) (e.g., extension 180, extension 182) of the cover (e.g., cover 138) can be disposed in the cavities between the sides (e.g., side 160, side 162) of the housing and the outer walls (e.g., outer wall 164, outer wall 166). For example, a portion of the extension 180 can be positioned inside the cavity 168 created between side 160 and outer wall 164. Similarly, a portion of the extension 182 can be positioned inside the cavity 170 created between side 162 and outer wall 166.

In some embodiments, while not expressly shown, the cover can be flush with, or inside the outermost point of the frame (e.g., the outermost point of top portion 136, or bottom portion 202). In some embodiments, the cover assembly is positioned such that the outermost point of the frame (e.g., the outermost point of top portion 136, or bottom portion 202) can be flush with the edge of a wall. For example, the outermost point of the frame can be flush with a wall and the rest of the assembly can be positioned in the opening of the wall. In some embodiments, when the cover is in the closed configuration, the cover can be flush with the outermost point of the frame and with the wall. In some embodiments, the cover can protrude from the wall. In some embodiments, the cover can be recessed within the wall.

In some embodiments, while not expressly shown, the cover can include a latch. In some embodiments, the latch can secure the cover (e.g., to the frame, to the housing, etc.) in the closed configuration to prevent the cover from opening.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

The invention claimed is:

1. An assembly comprising:
- a housing configured to be installed in an opening of a wall;
  - wherein the housing includes a first side, a second side, and a third side;
    - wherein the first side is open;
    - wherein the second side extends from an outer perimeter of the first side towards the third side;
    - wherein the third side is opposite the first side; and
    - wherein the second side is orthogonal to the first side;
- a cover assembly, the cover assembly being movably coupled to the housing, the cover assembly including;
  - a cover;
    - wherein the cover has a closed configuration and an open configuration;
      - wherein the cover is configured to transition from the closed configuration to the open configuration by rotating the cover from a position covering the first side of the housing to a position where a gap is disposed between the cover and a bottom of the first side of the housing; and
    - wherein the cover includes a first side panel extending from a first edge of the outer perimeter of the cover, and a second side panel extending from a second edge of the outer perimeter of the cover; and
  - wherein when the cover is in the closed configuration, an outer surface of the cover is flush with an outer surface of the wall; and
  - wherein, when the cover is in the open configuration, at least one of the first side panel or the second side panel at least partially extends into the opening of the wall.

2. The assembly of claim 1, wherein an inner face of the first side panel extends orthogonally from an inner face of the cover, and wherein an inner face of the second side panel extends orthogonally from the inner face of the cover.

3. The assembly of claim 1, wherein, when the cover is in the closed configuration, the first side panel and the second side panel are configured to be positioned inside the opening of the wall.

4. The assembly of claim 1, wherein, when the cover is in the closed configuration, the cover covers the first side of the housing.

5. The assembly of claim 1, wherein, when the cover is in the closed configuration, the cover seals at least part of the first side of the housing.

6. The assembly of claim 1, wherein the cover includes an opening at a bottom edge of the cover and wherein, when the cover is in the closed configuration, the opening at the bottom edge of the cover is configured to allow an electrical cord to enter the housing.

7. The assembly of claim 1, the cover assembly further comprising a mount coupled to a top of the cover.

8. The assembly of claim 7, wherein the mount is configured to enable the rotation of the cover from the closed configuration to the open configuration.

9. The assembly of claim 1, wherein an outer edge of the first side panel and an outer edge of the second side panel are curved.

10. An assembly comprising:
- a housing configured to be installed in an opening of a wall;
  - wherein the housing includes a first side, a second side, and a third side;
    - wherein the first side is open;
    - wherein the second side extends from an outer perimeter of the first side towards the third side;
    - wherein the third side is opposite the first side; and
    - wherein the second side is orthogonal to the first side;
- a cover assembly, the cover assembly being movably coupled to the housing, the cover assembly including;
  - a cover;
    - wherein the cover has a closed configuration and an open configuration;
      - wherein the cover is configured to transition from the closed configuration to the open configuration by rotating the cover from a position covering the first side of the housing to a position where a gap is disposed between the cover and a bottom of the first side of the housing; and
    - wherein the cover includes a first side panel extending from a first edge of the outer perimeter of the cover, and a second side panel extending from a second edge of the outer perimeter of the cover;
      - wherein an outer edge of the first side panel and an outer edge of the second side panel are curved;
  - a frame;
    - wherein the frame surrounds the outer perimeter of the housing;
  - a channel formed between the frame and the housing;
    - wherein the channel is configured to receive the side first side panel and the second side panel; and
  - wherein when the cover is in the closed configuration, an outer surface of the cover is flush with an outer surface of the wall.

11. The assembly of claim 10, wherein the first edge of the outer perimeter of the cover and the second edge of the outer perimeter of the cover are parallel.

12. The assembly of claim 10, wherein a first channel is formed in the first side panel and a second channel is formed in the second side panel.

13. The assembly of claim 10, wherein a first cavity is formed between a fourth side of the housing a first side of the frame, and a second cavity is formed between a fifth side of the housing and a second side of the frame.

14. The assembly of claim 13, wherein the first cavity is configured to receive the first side panel, and the second cavity is configured to receive the second side panel.

15. The assembly of claim 10, wherein, when the cover is in the open configuration, a weight of the cover is configured to apply a force to push the cover into a closed configuration.

16. The assembly of claim 10, wherein, when the cover is in the closed configuration, the frame, the cover, and the wall are flush.

17. The assembly of claim 10, wherein, when the cover is in the open configuration, at least one of the first side panel or the second side panel at least partially extend into the opening of the wall.

18. The assembly of claim 10, wherein, when the cover is in the open configuration, the first side panel and the second side panel are disposed completely outside the opening of the wall.

19. A cover assembly configured to be coupled to a housing, the cover assembly including:

a frame defining an outer perimeter of the cover assembly;

a cover rotatably connected to the frame;

wherein the cover has a closed configuration and an open configuration;

wherein when the cover is in the closed configuration, the cover is flush with an outer surface of the frame;

wherein the cover is configured to rotate from the closed configuration to the open configuration;

wherein the cover includes a first side panel extending from a first edge of the outer perimeter of the cover, and a second side panel extending from a second edge of the outer perimeter of the cover;

wherein, when the cover is in the closed configuration, the first side panel and the second side panel are configured to extend past the frame; and wherein when the cover is in the open configuration, a portion of at least one of the first side panel and the second side panel are configured to at least partially extend through the frame; and a mount;

wherein the mount is coupled to a top of the cover; and wherein the mount is configured to enable the rotation of the cover from the closed configuration to the open configuration.

20. The cover assembly according to claim 19, wherein the frame is configured to be secured to a housing such that the cover closes the housing in the closed configuration.

* * * * *